US005565059A

United States Patent [19]

Edwards et al.

[11] Patent Number: 5,565,059

[45] Date of Patent: Oct. 15, 1996

[54] APPARATUS AND METHOD FOR PREPARING PRINTING LABELS

[75] Inventors: Russell J. Edwards; Richard W. Abrams, both of Jacksonville, Fla.; Borge P. Gundersen, Tikob, Denmark; William E. Holley, Ponte Vedra Beach, Fla.; Thomas C. Ravn, Helsignor, Denmark; Mark E. Schlagel; Daniel T. Wang, both of Jacksonville, Fla.

[73] Assignee: Johnson & Johnson Vision Products, Inc., Jacksonville, Fla.

[21] Appl. No.: 257,789

[22] Filed: Jun. 10, 1994

[51] Int. Cl.[6] .................... B32B 31/04

[52] U.S. Cl. .................... 156/517; 156/271; 156/252; 156/264; 83/660; 83/277; 83/405; 83/408

[58] Field of Search .................... 156/259, 271, 156/554, 252, 518, 520, 264, 265, 257, 268, 517, 519; 83/660, 277, 405, 408

[56] References Cited

U.S. PATENT DOCUMENTS

| | | | |
|---|---|---|---|
| 3,607,537 | 9/1971 | Von Hofe et al. | 156/252 X |
| 3,715,856 | 2/1973 | Borel | 156/268 X |
| 3,823,050 | 7/1074 | La Mers | 156/518 X |
| 3,958,051 | 5/1976 | Smith | 156/252 X |
| 4,220,493 | 9/1980 | Wehr et al. | 156/518 X |
| 4,363,685 | 12/1982 | White | 156/212 |
| 4,377,432 | 3/1983 | Zodrow et al. | 156/215 |
| 4,512,844 | 4/1985 | Kobiella . | |
| 5,066,352 | 11/1991 | Albers et al. | 156/265 |
| 5,286,317 | 2/1994 | Treat et al. | 156/268 X |

FOREIGN PATENT DOCUMENTS

| | | | |
|---|---|---|---|
| 460201 | 10/1949 | Canada | 83/277 |
| 0084725 | 5/1984 | Japan | 156/252 |
| 5154946 | 6/1993 | Japan | 156/252 |

*Primary Examiner*—David A. Simmons
*Assistant Examiner*—Steven J. Helmer

[57] ABSTRACT

An apparatus for the processing and segmenting of a cover-forming laminate web or sheeting structure which is adapted to interconnect a plurality of containers, such as the base members of blister packages each of which is designed to contain a hydrophilic contact lens in a sterile aqueous solution. More specifically disclosed is an apparatus for the imprinting, perforating, slitting and cutting the laminated web structure such that the severed laminate segments constitute printed covering label for an array of such containers, and whereby the laminated web or sheeting segment may be severed along weakening or perforation lines so as to provide a separable packaging arrangement for individual of the containers which are subsequently adhered thereto.

19 Claims, 5 Drawing Sheets

APPARATUS AND METHOD FOR PREPARING PRINTING LABELS

BACKGROUND OF THE INVENTION

1. Field of the Invention

The present invention relates to an apparatus for the processing; in effect perforating, cutting and severing a continuous laminated web or sheeting structure into cover and printed label-forming segments each of which is adapted to interconnect and sealingly cover a plurality of containers, such as the base members of blister packages designed to each respectively contain a hydrophilic contact lens in a sterile aqueous solution. More specifically, the invention pertains to the provision of an apparatus for the perforating, slitting and cutting into specified segments of the laminated web or sheeting structure such that each severed segment constitutes a printed covering label for precise placement on an array of such containers. The apparatus contemplates the laminated web to be imparted with a plurality of spaced weakening or perforation lines prior to segmenting thereof so as to provide individually detachable packaging arrangements for each individual container from the array of interconnected containers.

Moreover, the invention is also directed to a novel and unique method of perforating, slitting and severing into segments a continuous web or sheeting of a laminated material, such that each severed segment is adapted to form a unitary covering and printed label for an array of containers each containing a hydrophilic contact lens in a sterile aqueous solution through utilization of the inventive apparatus.

The packaging of hydrophilic contact lenses in a sterile aqueous solution is well known in the contact lens manufacturing technology. In particular, packaging arrangement of that type generally consist of so-called blister packages adapted to be employed for the storage and dispensing of the hydrophilic contact lenses for use by a medical practitioner or by a consumer who intends to wear the contact lenses. Such hydrophilic contact lenses, which may be disposable after a single wear or short-term use, are inexpensively manufactured from suitable hydrophilic polymeric materials, for example, copolymers of hydroxyethylene methacrylate containing from about 20% to 90% or more of water, depending upon the polymer composition. These contact lenses are generally stored in a sterile aqueous solution, ordinarily consisting of an isotonic saline solutions, order to prevent dehydration and to maintain the lenses in a ready-to-wear condition.

A container of the foregoing type, normally comprises a base member which is molded from a suitable injection-molded or thermmoformed plastic material; for instance, such as polypropylene, and incorporates a cavity adapted to house the contact lens in the aqueous solution, and which is sealingly closed by a label-forming cover, preferably in the form of a flexible multi-layered laminated web or sheeting structure to provide a so-called blister package. This type of packaging arrangement has found widespread use in view of the inherently advantageous storing properties thereof and easy-to-dispense nature of the package by simply peeling the adherent cover from the base member, thereby enabling a user to gain ready access to the contact lens which is contained in the cavity of the base member. For example, a blister package which is adapted to provide a sterile sealed storage environment for a disposable, essentially single-use hydrophilic contact lens, which may normally be worn for a period of between about 8 to 16 hours during any 24-hour period, has the lens immersed in a sterile aqueous solution within the package, as is described in copending U.S. patent application Ser. No. 08/257,795 (Attorney Docket No. 9012, VTN-0088), which is commonly assigned to the assignee of the present application and the disclosure of which is incorporated herein by reference.

In the above-mentioned copending U.S. patent application, the blister package for storing and dispensing a hydrophilic contact lens includes an injection-molded or thermoformed plastic base portion or member incorporating a molded cavity which is surrounded by an outstanding planar flange extending about the rim of the cavity. A flexible cover sheet, such as a multi-layered laminated structure is adhered to the surface of the flange in order to sealingly enclose the cavity in a generally liquid-tight manner. The surface of the cover sheet may constitute a label and be imparted suitable printing indicia informative of the product stored in the blister package, the name and address of the manufacturer, incorporate various decorative designs and logos as desired; and also provide for changeable information, such as lot numbers, expiration dates, fitting parameters, lens power, and the like in addition to the foregoing, such as may be required by FDA regulations.

Heretofore, such blister packages have been generally sold as individual or single units and the imprinted information provided thereon is completed for each blister package.

However, when it is intended to sell arrays or multiples of such blister packages which are detachably interconnected, each containing respectively a single hydrophilic contact lens, the opportunity may arise for a diverter to pass off the relatively inexpensive disposable product contained in each of the respective detached blister packages as a more expensive single unit item. In essence, such single-use or disposable contact lenses could be conceivably passed off as more expensive reusable contact lenses, potentially causing significant aconomic losses to the manufacturer and sellers, while also raising the possibility of potential legal liabilities in the event that the product is not properly used or worn for extended periods of time so as to result in physical harm to a user.

At this time, there has accordingly been addressed the concept of the development of new and unique packaging arrangements of the blister package type, particularly for the containment of hydrophilic contact lenses in a sterile aqueous solution, wherein a plurality of base members, each formed with a cavity for containing a hydrophilic contact lens in a sterile saline solution, are adapted to be positioned in a contiguous array and sealingly covered by a single or unitary flexible cover sheet, the latter of which is preferably in the form of a flexible multi-layered imprinted label-forming laminate. In this instance, the laminate is provided with weakening lines, such as micro-perforating, intermediate each of the respective base members so as to enable individual segments of the flexible laminate to be detached along the weakening lines or perforations without affecting the integrity of the sealed blister packages, and in conjunction with the therewith associated base member, to be separated from the array when it is desired to gain access to the single contact lens contained therein.

In essence, the lines of perforations which are present in the laminate forming the unitary cover sheet for an array of interconnected blister packages provides an easy opening feature enabling a consumer to readily separate individual of the blister packages without damaging the sterile integrity of an adjacent blister package. Moreover, the perforations still provide adequate strength to remain for the laminate cover sheet material to enable automated material handling thereof; for instance, after post-hydration and shipment of the packages to the consumer.

This type of array of multiple interconnected blister packages enables the compact packaging of a plurality of such arrays, each possessing a specified number of contact lens-containing base members interconnected by a single flexible cover sheet, within the confines of a suitable container, such as a rigid paperboard carton. In the carton there may be compactly stored a plurality of interleaved and superimposed layers of arrays of blister packages; for example, each array having five interconnected blister packages each with a single contact lens disposed therein. The carton may be designed to store six arrays of blister packages, positioned in three tiers each consisting of two inverted and interleaved arrays, for a total of thirty blister packages; in essence, containing a 30-day supply of contact lenses for respectively one eye of a user. A packaging arrangement for contact lenses of that type which is in the form of arrays of interconnected blister packages is disclosed in applicant's copending U.S. patent application Ser. No. 08/257,796, entitled "Packaging Arrangement for Contact Lenses" (Attorney Docket No. 9014, VTN-0090), which is commonly assigned to the assignee of the present application and the disclosure of which is incorporated herein by reference.

The blister packages which are formed through the intermediary of this structure comprise a plurality of contiguously linearly arranged thermoformed or injection-molded base members each possessing a cavity for housing a hydrophilic contact lens in a sterile saline solution, and wherein the resultant array of such base members; for example, five (5) base members, is adapted to be sealingly covered and interconnected by a single flexible multi-layered laminated web segment which also forms a common printed label, preferably of the kind as disclosed in copending U.S. patent application Ser. No. 08/106,386, filed Aug. 13, 1993 (Attorney Docket No. 9013, VTN-0098), which is commonly assigned to the assignee of the present application, and the disclosure of which is incorporated herein by reference.

In the foregoing disclosure, the multi-layered laminated web includes an outer layer of a plastic film material which is adhesively bonded to the surface of a supporting metallic foil, such as aluminum, or in lieu of the latter may be coated with silicon oxide, and in which the outer layer is illustrated as being double-side printed; in effect, on both opposite surfaces, although it is possible to contemplate imparting the printing to only one surface of the outer plastic film layer. The surface of the outer plastic film layer which faces towards and is adhered to the metallic foil (or coated with silicon oxide) is imprinted with suitable indicia and legends which may consist of permanent information regarding the manufacturer and the product, logos, instructive material, and decorative and advertising indicia relative the product in the blister package; whereas the opposite or exterior surface of the outer plastic film material layer may be imprinted with suitable variable information, such as expiration dates, lot/batch numbers, fitting parameters and other data specific to the packaged product. The interior surface of the outer plastic film material layer may be imprinted through the intermediary of suitable lithographic printing, either in single color or multi-colors and also provided with an appropriate printed background; whereas the variable information specific to the product which is imprinted on specific areas of the outwardly facing surface of the outer film layer, may be printed thereon through thermal transfer printing, although the foregoing is set forth by way of example only, and other printing methods may be readily employable.

SUMMARY OF THE INVENTION

Accordingly, in order to be able to provide the segments of the multi-layered laminate web or sheet which are dimensioned to be able to be adhesively positioned on an array of base members in order to form covers and printing labels for each of the resultingly interconnected blister packages containing the contact lenses, the invention contemplates the provision of an apparatus containing structure for conducting a continuous web of the laminated web material to a printing station for imparting thereto specific changeable printing characters representative of the product in the blister package; and for advancing the printed laminate web to a perforating station for imparting predetermined spaced perforations transverse of the longitudinal advance of the web which are definitive of the widths of the individual blister packages so as to be able to extend therebetween; conveying the transversely perforated web past a slitting station including a slitting blade for dividing the web in the longitudinal direction thereof into at least two widths each conforming to the transverse width of the blister packages onto which the laminate is to be placed; and advancing the slit web widths to a cutting station having a transversely extending cutting blade for severing the web into individual segments each of a length in conformance with the length of the array of blister packages which are adapted to be covered by the segment forming the printed labels. Incorporated is a novel structure for intermittently drawing the web of the laminate material in a precisely dimensioned advancing motion so as to correlate the accuracy in the advance thereof with a scanning of the indicia or characters imprinted on the laminated web. Since the graphic repeats on the foil web are not exact from the information, the sensors scan the preprinted indicia or the field on the foil web to determine the exact pull length for character printing, character verification by a vision system, perforating and cutting. This will ensure the exactness in the lengths of the severed segments which are adapted to be placed and adhesively fastened to contact lens-receiving base members for forming the array of blister packages.

More specifically, the invention contemplates the provision of an apparatus as described herein, which incorporates sensors for scanning indicia or characters imprinted on the laminated web so as to provide control over the intermittent advance and exactness thereof by the laminated web so as to enable severing of the web into accurately dimensioned segments prior to placement of the segments on an array of base members.

The invention also contemplates the provision of an apparatus as described herein whereby the perforations transversely extending across the laminated web are implemented through a plurality of rotatable perforating elements contacting the surface of the laminate web and which are spaced from each other in the direction of advance of the web so as to define the widths of each of the blister packages which are to be formed upon being covered by the segments of the laminated web material.

Another aspect of the invention resides in the provision of an apparatus as described herein, wherein sensors operatively scanning indicia on the web correlate the incremental forward advance of the laminated web with the imprinted indicia or characters thereon, and whereby the sensors in response to the scanned characters imparted to the surface of the web by the printing device at the printing station, control the advance of the web and the precision thereof.

Still another aspect of the invention resides in the provision of a novel method for printing, imparting perforations, longitudinal slits and subsequent severing into segments of precise locations and lengths from a continuous web supply so as to produce severed segmented and perforated portions from the web which are adapted to be placed in an accurate alignment over contiguously positioned base members each containing a contact lens in order to form the array of interconnected blister packages which are adapted to be separated into individual blister packages along the transverse perforations extending therebetween without affecting the integrity of the contents of the blister packages.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
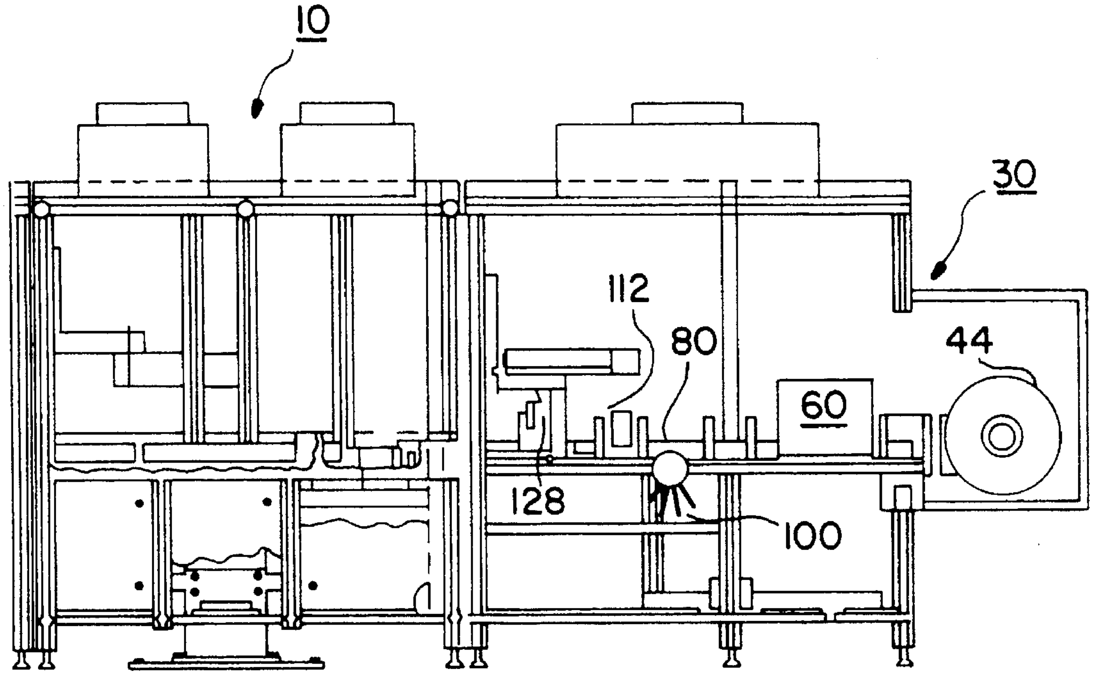
FIG. 1 illustrates a generally diagrammatic side elevational view of an installation for the assembly of blister packages for the containment of contact lenses.
Figure 2:
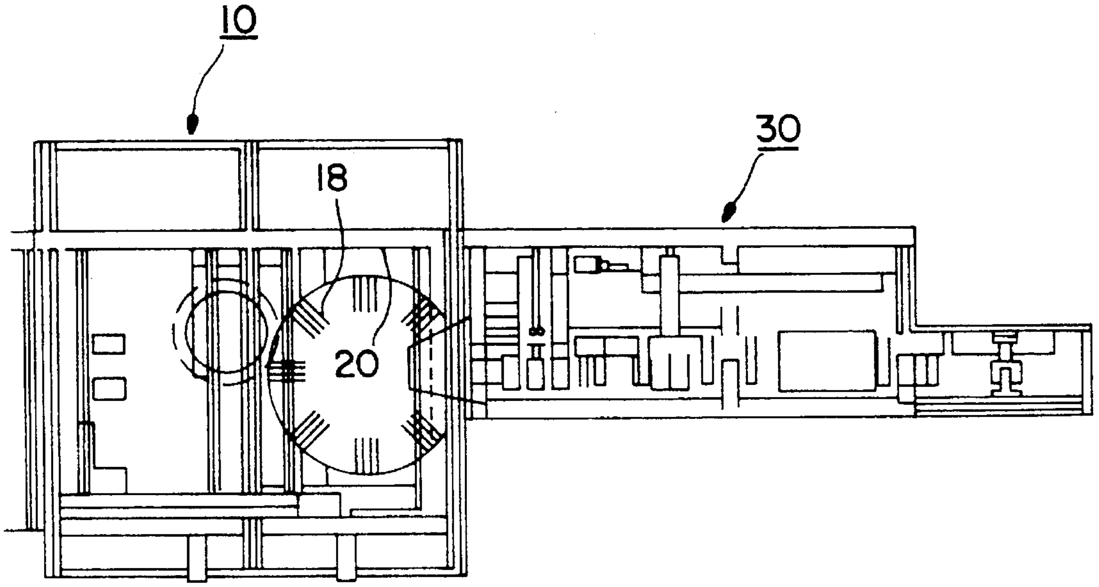
FIG. 2 illustrates a top plan view of the installation of FIG. 1.
Figure 9:
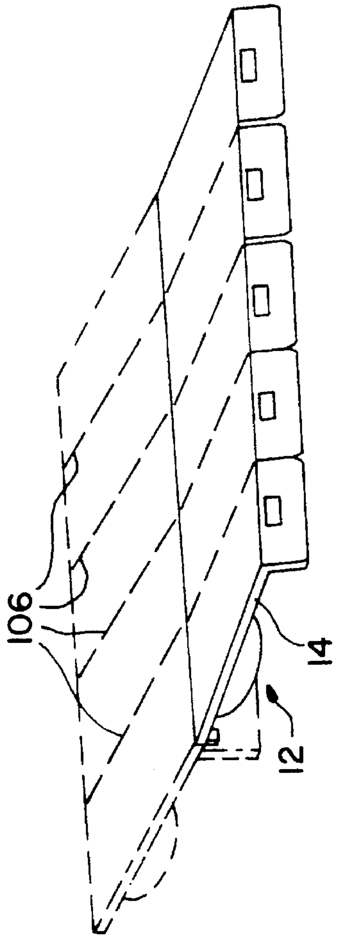
FIG. 9 illustrates the placement of a pair of segmented web portions as shown in FIG. 8 in side-by-side relationship onto a plurality of base members for the formation of arrays of blister packages containing the contact lenses.

Referring specifically to FIGS. 1 and 2 of the drawings, there is diagrammatically disclosed an installation 10 for the packaging of contact lenses in arrays of so-called blister packages 12 comprising base members which are sealingly covered and connected by a single laminated flexible cover or sheet 14 adapted to constitute printed labels for each of the blister packages, as shown in FIG. 9 of the drawings. The installation 10 is described in detail in the disclosure of copending U.S. patent application Ser. No. 08/257,787 (Attorney Docket No. 9017; VTN-0093) which is commonly assigned to the assignee of this application, and the disclosure of which is incorporated herein by reference.

In essence, in the installation 10, the contact lenses are each respectively immersed in a sterile saline solution contained in the cavity of a base member of a blister package 12, the latter of which is described in detail in the disclosure of copending U.S. patent application Ser. No. 08/257,796 (Attorney Docket No. 9012, VTN-0088) and copending U.S. patent application Ser. No. 08/257,796 (Attorney Docket No. 9014, VTN-0090), both of which are assigned to the common assignee of the present application and the disclosures of which are incorporated herein by reference.

Briefly, each of the base members is adapted to be positioned in a recess formed in transfer pallet 18, whereby each pallet may be provided with ten (10) recesses, such as in two rows each of five (5) recesses, each adapted to house respectively one base member containing a contact lens in the sterile saline solution. The process for equipping such pallets with contact lens-filled base members may be implemented through a suitable dial arrangement in which a turntable 20 is rotationally indexed to come into alignment with a placement device for positioning segments of a flexible laminate material over each of the arrays of base members containing the contact lenses so as to interconnect a linear array of five base members and form the arrays of blister packages as shown in FIG. 3.

The apparatus for preparing the laminated material segments which essentially forms the printed label cover for each of the blister packages 12 and which also provides for the formation of two parallel rows each of five such blister package arrays, for instance, as shown in FIG. 9 of the present application and as discussed in detail hereinbelow, is now elucidated with regard to FIGS. 3 through 6 of the drawings.

Figure 3:
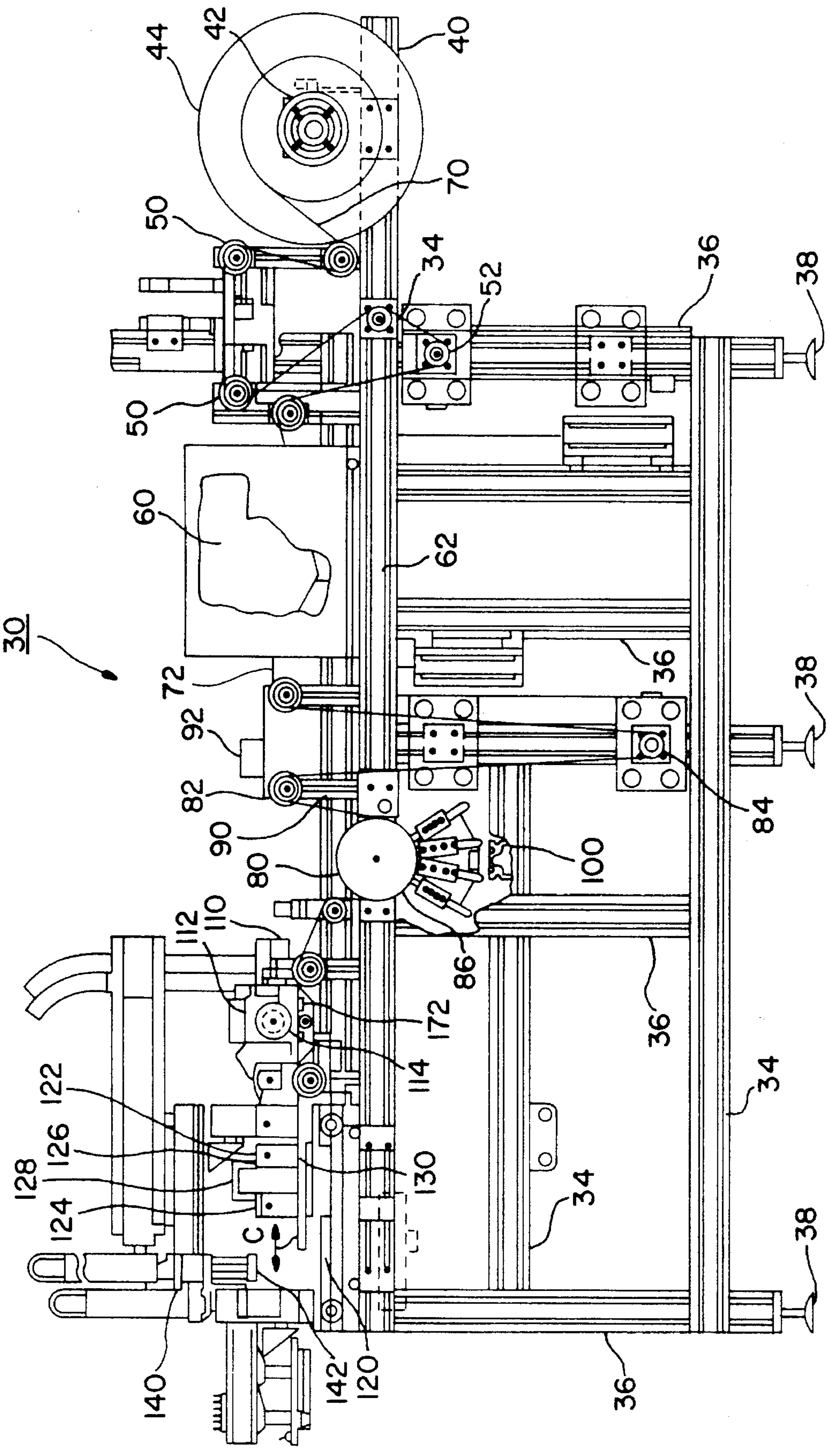
FIG. 3 illustrates a side elevational view of the apparatus pursuant to the invention for imprinting, perforating, slitting and cutting into segments a continuous web of a laminated material preparatory to placement thereof on a plurality of contact lens-containing base members so as to form an array of blister packages commonly interconnected by the severed segment.
Figure 4:
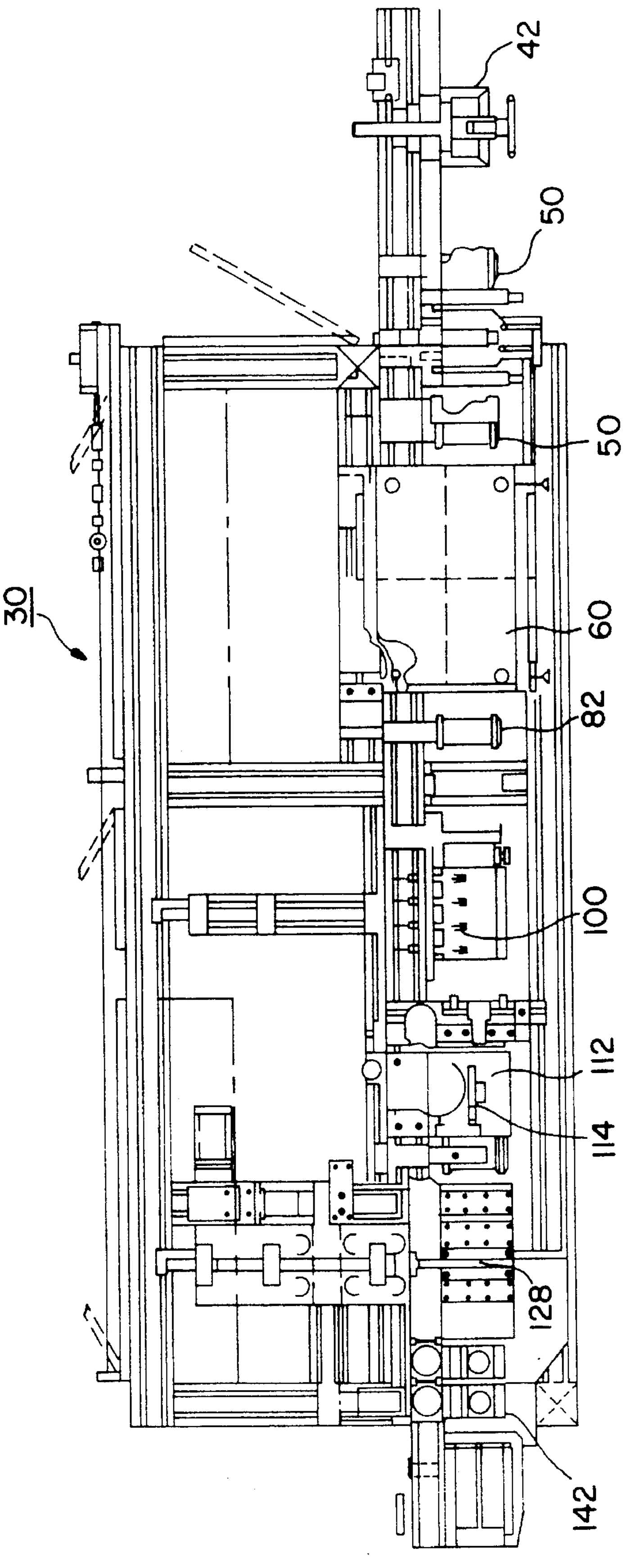
FIG. 4 illustrates a plan view of the apparatus of FIG. 3.
Figure 5:
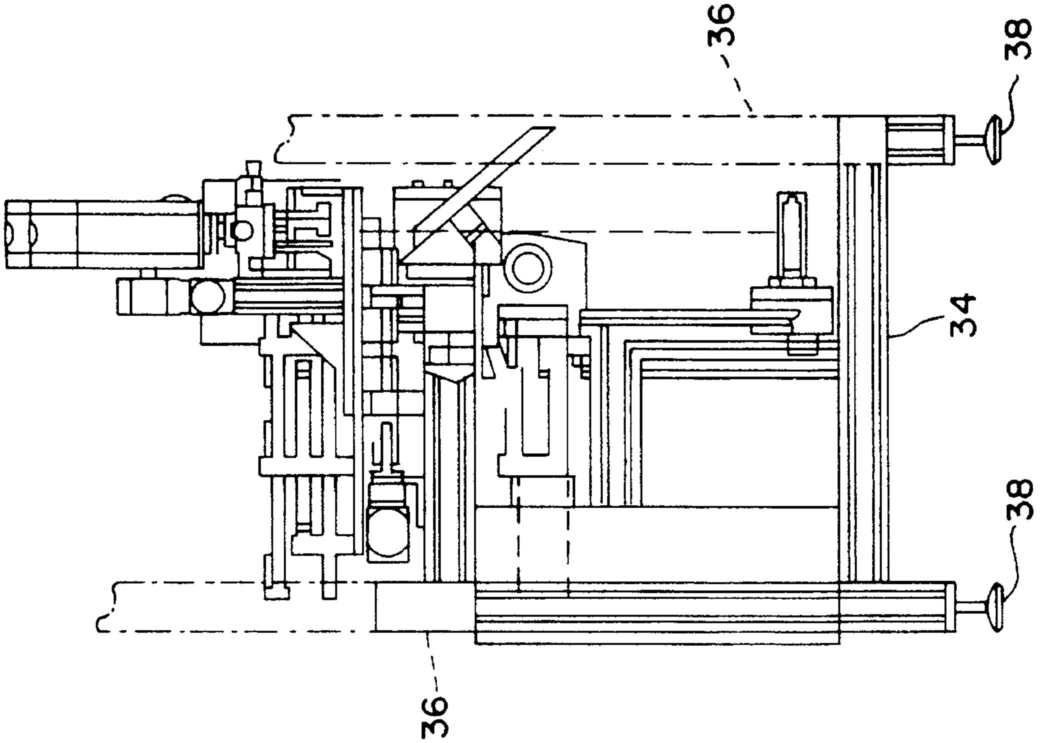
FIG. 5 illustrates, generally diagrammatically, an elevational sectional view of the apparatus taken along line 5—5 in FIG. 3.

Referring particularly to FIGS. 3 through 5, there is diagrammatically illustrated an apparatus 30 processing a multi-layered flexible laminate to produce the printed label covers for the array of blister packages, with such laminate being preferably of the type disclosed in copending U.S. application Ser. No. 08/257,795 (Attorney Docket No. 9012, VTN-0088), and which is supplied from a continuous supply roll of the laminate material.

The apparatus 30 which is designed to provide specific product-identifying printing on the laminate material, perforations, slitting and cutting operations to provide for the separated cover segments for placement on the arrays of base members in the installation 10, as mentioned hereinbefore, basically includes a stationary frame structure of rigid construction including a plurality of horizontally extending support beams 34 interconnecting uprights 36 possessing leg sections 38 for firmly supporting the apparatus on a base or floor surface. On a horizontal beam extension 40, there is located a rotatably journaled shaft and pulley unit 42 on which there is adapted to be rotatably mounted a continuous supply roll 44 of the flexible laminate material, the latter being of a width which corresponds to the width A of two parallel rows of base members of blister packages located in contacting end-to-end position, as shown in FIG. 9 of the drawings, as would be the orientation thereof on the pallets 18 in installation 10. The web of laminate material which is unwound from the supply roll 44 for transport through apparatus 30 is entrained over a plurality of idler rollers collectively designated by 50, including a tension member in the form of a device 52 which is intended to maintain a predetermined variable tension on the web 70 of laminate material dispensed from the supply roll 44 as the material enters the apparatus 30. Alternatively, a weighted roller device or a constant tensioner device may be substituted for the illustrated variable tensioner member 52 which is in the form of a roller unit.

The laminate web 70 is conducted through a printing unit 60 which is mounted on an upper support beam structure 62 of the apparatus 30, such that suitable indicia, characters or legends, preferably, although not necessarily, by thermal printing, are adapted to be imprinted on the upper surface 72 of the laminate web 70 at specific spaced intervals within designated areas 74, 76, 78 on each segment of the laminate web source to define lots, batch numbers, expiration dates, and fitting parameters, such as the power of the contact lens, for each respective blister package which is to be preduced in the installation 10. Fixedly mounted in the apparatus 30 is a smooth-surfaced perforating drum 80 located downstream of a set of idler rollers, collectively identified by 82, and a dancer roller arrangement 84 for maintaining a predetermined longitudinal tension on the imprinted laminate web 70 as the latter is conveyed from the printing unit 60. The laminate web 70 is entrained about the lower portion of the circumferential surface 86 of the perforating drum 80 so as to be transported in slidable surface-contact therewith.

Positioned on a support structure 90 of the framework of the apparatus 30 which supports idler rollers 82 is a sensor arrangement 92, such as a camera unit, which is adapted to scan characters imprinted onto the surface 72 of laminate web 70 by the printing unit 60, as well as sensors (not shown) in the surface 86 of stationary drum 80, for a purpose as elucidated hereinbelow.

Figure 6:
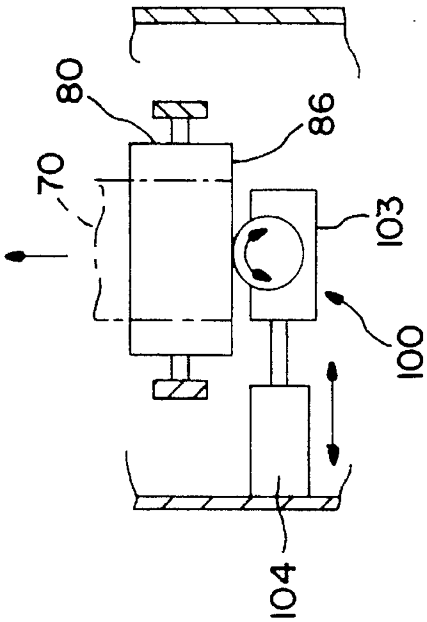
FIG. 6 illustrates, on an enlarged scale, a diagrammatic sectional view through the perforating knife assembly for perforating the laminated web taken along line 6—6 in FIG. 3.
Figure 7:
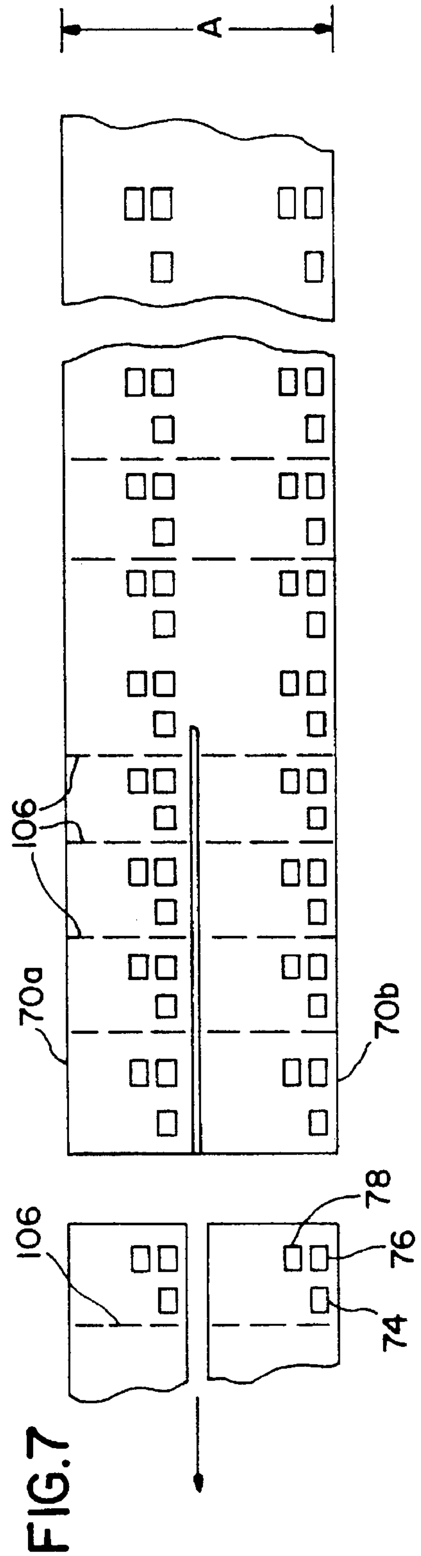
FIG. 7 illustrates, generally diagrammatically, a plan view of the laminated web utilized for forming the cover structure and printed labels for the array of blister packages.
Figure 8:
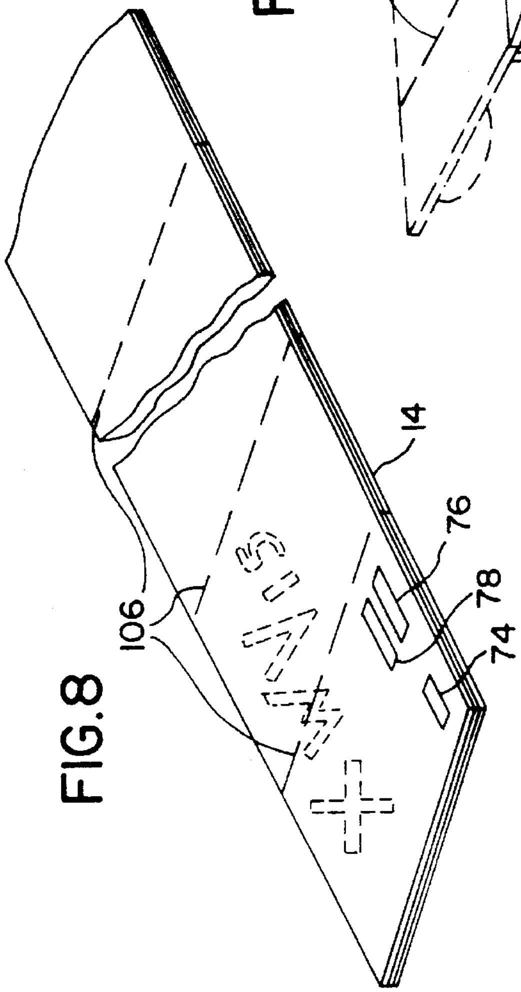
FIG. 8 illustrates a portion of the web of FIG. 7 shown subsequent to the imprinting, perforating, slitting and severing into segments thereof.

Located in close proximity with the lower circumferential surface portion 86 of the drum 80 are a plurality of perforating knives 100, which may be serrated or toothed disc-shaped blades, as shown schematically in FIG. 6, oriented coaxially with the longitudinal center axis the drum 80, and which are adapted to be reciprocated longitudinally therealong through the intermediary of displacements being imparted thereto through a pneumatically-operated piston and cylinder device 104, to be able to cause the teeth or serrations on the perforating knife or blade surfaces to cut into the laminated web and produce perforation lines 106 in the laminate web, as shown in FIGS. 7 through 9, in a direction extending transversely of the longitudinal or machine direction of the laminate web.

A unique feature of the blades perforating the foil web against a hard surface 86 resides in that few particles are generated by this process, enhancing and ensuring a clean environment for the perforations.

The perforating knives or blades for forming the perforation, in this case four in number, are oriented so as to be angled radially towards the longitudinal center axis of the perforating drum 80, and their cutting edges are spaced with regard to each other so as to produce lines of perforations at mutually predetermined spaced intervals along the length of the laminate web 70, as described hereinbelow.

Arranged downstream of the perforating drum 80 in the direction of conveyance of the laminate web in the apparatus and mounted stationarily on an upper support 110 is a web slitting unit 112 equipped with a rotatable disc-shaped slitting blade or knife 114 oriented in the direction of conveyance for the web. Alternatively, instead of a rotary blade, the slitting may be effected by means of a "scissors-type" cutter or straight slitting blade. The slitting blade 114, during the conducting of the laminate web therepast, is intended to separate the web into two equally-sized continuous strips 70*a* and 70*b*, as shown in FIG. 7 of the drawings.

The slitting knife unit 112, is fixedly located at a predetermined distance downstream of the perforating knives 100 and drum 80 and includes a sensor arrangement for scanning the characters on the laminate web surface imprinted thereon by the printing unit 60.

Supported for movement along a guide rail structure 120 of the apparatus 30 is a carriage 122 possessing spaced upright supports 124, 126 and mounting a cutting knife 128 movable transversely of the direction of conveyance of the laminated web through apparatus 30, enabling the cutting knife 128 to sever the perforated and longitudinally slit laminate web portions 70*a*, 70*b* into segments of predetermined length commensurate with the number of adjacently located base members of arrays of blister packages to be produced which are to be jointly covered thereby as a unitary printed label covering. The movable carriage 122 for the transverse cutting knife 128 is equipped with openable and closable slide grippers 130 for selectively engaging opposite side edges of the laminate web portions 70*a*, 70*b*. Movable vacuum devices 140 possessing suction units 142 are adapted to be reciprocated vertically proximate the downstream outlet end of apparatus 30 so as to be able of engaging severed laminated web segments and transporting them towards the dial mechanism of the installation 10 for placement on the plurality of base members which are located in the pallets 18 so as to produce completed arrays of blister packages 12 as shown in FIG. 9, upon being adhered or sealed to each other.

The graphics or indicia grouping position on the laminate web 70 is verified by a photoelectric sensor mounted just above the foil surface. Each time the web is pulled and is ready for cutting, the sensor state is tested to verify that diagonal stripes printed on the web have been positioned properly prior to cutting to ensure proper graphic grouping in the web.

OPERATION OF THE APPARATUS

The operation of the apparatus 30 which is employed to produce the unitary printed label cover structure for arrays of blister packages is now described as being essentially as follows:

A supply roll 44 consisting of a continuous web of flexible multi-layered laminated material as described hereinabove which; for example, may be of a construction as disclosed in copending U.S. patent application Ser. No. 08/257,795 (Attorney Docket No. 9012, VTN-0088) is mounted on the shaft and rotatable pulley unit 42, and the web is entrained over the idler and tension rollers 50, 52 so as to be conducted into and through the printing unit 60. In connection with the foregoing, reference may be had to FIG. 7 illustrating, for purposes of clarity only, the web of material 44 being conveyed through the apparatus 30 in an imaginary generally flat planar motion.

The forward or advancing motion to the laminated web 44 is effected through released sliding along the edges of the web by the sliding grippers 130 of the movable carriage 122 when the latter is displaced rearwardly along the direction of double-headed arrow C towards the web slitting unit 112; the edges of the web 44 thereafter being engaged by the sliding grippers 130, and the web then drawn forwardly upon advance of the carriage 122 in the opposite direction along arrow C towards the outlet end of the apparatus 30. This, in effect, will impart an intermittent or indexed advance or forward movement to the laminated web 70 through the apparatus 30.

During intervals when the edges of the laminated web 70 are not clampingly engaged by the sliding grippers 130, stationary grippers 113 proximate the slitting unit 112 may be adapted to engage the laminated web 70 so as to prevent any longitudinal shifting or possible flexing or bowing of the web which would negate the accurate or precisely measured indexed advance thereof and prevent the formation of the desired printed label covers for the blister packages.

In the printing unit 60, the laminated web 70 is imprinted, for example through thermal printing, with suitable content identifying characters, representative of lot and batch number, and fitting parameter, such as lens power of the contact lens which is to be contained in each subsequently to be formed blister package. As illustrated, the laminated web 70 is approximately twice the width of a single length of a base member of a blister package 12 and; in effect comprises the width A of the two base members in a contacting end-to-end relationship, as shown in FIG. 9 of the drawings.

As the laminated web is conveyed from the printing unit 60 over a further series of idler rollers and dancer rollers 82, 84 which impart the necessary tension to the laminated web 70, it is passed about rotatable drum structure 80 of perforating knife arrangement 100. In this case, the web is directed to extend about the lower circumferential surface portion 86 of the drum as the perforating knives are adapted to pass transversely across the width of the laminated web 70 during the period when the web is stationary.

As the perforating knives 100 are displaced transversely across the bottom of the drum 80 by the piston and cylinder device 104, the serrated or toothed edges (not shown) cut into the laminated web 70 so as to produce lines of microperforations, as shown in FIGS. 7 through 9, which are spaced apart 30 mm; in essence, the width of a respective base member of a blister package 12. Herein, there are provided four (4) perforating knives 100 to form four perforation lines in parallel spaced relationship, with a total distance between the perforating knives 100 of 90 mm. Suitable air cylinders (not shown) may also be provided to control the depth of the perforations being imparted to the laminated web 44 by the perforating knives 100.

As leading end of the laminated web 70 is engaged by the sliding grippers 130 of the reciprocable carriage 122, upon being in the position in which the carriage is retracted towards the slitting knife unit 112, with the edge grippers 130 engaging the web, the carriage 122 is displaced forwardly towards the outlet end of the apparatus 30, drawing the web forwardly by a precise distance, in this instance by 150 mm, so as to provide a web length of 60 mm between each set of four lines of perforations so as to ultimately provide for the 30 mm widths of five adjoiningly connected base members for an array of blister packages. The carriage 122 upon being moved forwardly, causes laminated web 70 to be drawn through the web slitting unit 112 such that the rotary blade 112 slits the web into two continuous web portions 70*a*, 70*b*, each one-half the width A shown in FIGS. 7 and 9.

Upon the carriage 122 having completed the forward advance along guide rail structure 120, the transversely oriented cutting knife 128 located between upright supports 124 and 126 is actuated so as to sever the perforated and longitudinally slit laminated web portions 70*a* and 70*b* into the 150 mm lengths at precisely the middle of the 60 mm unperforated distance between the successive sets of four perforation lines. This resultingly produces five interconnected printed label covers from each severed web segment 44*a* and 44*b*.

Subsequent to the severing of the laminated web portions 70*a*, 70*b* into the required segments each of 150 mm in length, the carriage 122 is retracted part of the distance towards the slitting knife device 112 so as to enable suitable vacuum structures (not shown) to each engage respectively one of the severed web segments and to transport them to the dial mechanism of installation 10 for placement over ten base members on a pallet 18 so as to form two arrays each of five interconnected blister packages 12, as shown in FIG. 9.

The extent and accuracy in the forward indexed movement and displacement of the laminated web 70, as shown in FIG. 7, is controlled through the intermediary of suitable sensors 92, such as camera devices, located adjacent the infeed end of the stationary drum 80 of the perforating knife structure 100, as sensors (not shown) in the drum facing the web 70, and whereby the indexed displacement of the cutting knife-mounting carriage 122 along the longitudinal extent of the apparatus 30 is also calibrated by sensors 172 located at the slitting device 112 which will read the precision in the positioning of characters imprinted on the laminated web by the printing unit 60 in correlation with the location of the characters entering the perforating station so as to ensure that the distance the web has been indexed forwardly within predetermined parameters or variances, such as ±0.2 mm for each intermittent advance of 150 mm for the laminated web. This is measured by the sensors 172 through scanning of the indicia or characters imprinted on the laminated web structure downstream of the slitting knife arrangement and also the calibration in relation thereto by the sensors 92 scanning the positioning of the printed character in each of an appropriate printing field on the web. In the event that the displacement is inaccurate, in effect, exceeds the ± 0.5 or preferably 0.2 mm variation allowed for each 150 mm of web advance, the apparatus 30 may include suitable structure for ejecting the incorrectly severed segments of the laminated web, and concurrently provide for an adjustment in the web feed mechanism of the apparatus, i.e. the displacement of carriage 122, so as to correlate the printed characters on the web 70 being scanned by the sensors 92, 172 with the extent of forward displacement of the laminated web.

Reverting to the web perforating arrangement, the latter of which includes perforating knives 100 in the form of four rotary cutting blades, each having perforating teeth extending about the circumference of the disk-shaped teeth (blades) member, for example 40 blades per inch of circumference to form microperforations, as shown in FIG. 6, the blades are supported in a housing 103 which is reciprocable across the width of the laminated web 70 along the lower surface 86 of the drum 80, upon the web being intermittently advanced into a stationary period at the drum, the four perforating blades as illustrated being spaced with respect to each other at the points of perforating contact with the laminated web so as to define a longitudinal spacing between perforation lines of 30 mm, four such perforations lines being formed, and thereafter the laminated web being advanced by the apparatus to produce a double spacing of 60 mm between sets of perforation lines; in effect, skipping one perforation line which, in lieu thereof becomes the transverse severing or cutting edge for the transverse cutting knife 128 to form the web segments for conveyance to the dial mechanism of installation 10.

From the foregoing, it becomes readily apparent that the apparatus and method provides for a unique and highly precise system of imparting suitable printing, perforations, slitting and severing of the laminated web to produce segments prior to placement thereof onto the base members containing the contact lenses in order to form the required printed label covers for arrays of interconnected blister packages.

Other aspects of the invention may provide imparting pneumatic pressure to the perforating blades or knives which, as required, may exert increased pressure of the knife cutting edges against the laminated web so as to force the knives deeper into the web during any sense the dulling of the knife edges. This may, of course, be implemented through suitable sensors (not shown) which determine the depth of the either partially deep or through microperforations in the laminated web at the web perforating arrangement.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An apparatus for producing printed labels forming covers interconnecting a plurality of blister packages, said covers each being a segment severed from a continuous length of a laminated wet), said apparatus including a framework for supporting said laminated web along a predetermined path of movement, comprising:

a) a movable carriage including grippers for engaging said laminated web and for intermittently advancing said web along said path of movement;

b) a printing arrangement for imprinting indicia on said laminated web at a first station along said path of movement;

c) a perforating device for imparting a plurality of spaced lines of perforations to said laminated web at a second station, said perforating device comprising a stationary drum mounted on said framework and a plurality of perforating knives being engagable with said laminated web in spaced relationship along said drum surface portion for imparting said lines of perforations to said web, said laminated web being conveyable in sliding contact with at least a portion of the circumferential surface of said drum, said lines of perforations extending transversely across the width of said laminated web; and d) a cutting structure being mounted on said movable carriage for severing said continuous web portions into said segments to produce said printed label-forming covers.

2. An apparatus as claimed in claim 1, wherein each said perforating knife comprises a rotatable disc-shaped blade having perforating serrations extending about the circumference thereof.

3. An apparatus as claimed in claim 1, wherein a pneumatically-actuated piston and cylinder means is operatively connected with each said perforating knife for reciprocating said perforating knives across the width of said laminated web.

4. An apparatus as claimed in claim 3, wherein said perforating knives include structure for adjusting the depth of the perforations formed in said laminated web.

5. An apparatus as claimed in claim 1, wherein sensor means are operatively associated with said perforating device for correlating the location of said perforating lines in said laminated web with indicia imprinted on said web by said printing arrangement.

6. An apparatus as claimed in claim 5, wherein said sensor means comprises a camera for scanning the indicia imprinted on said laminated web.

7. An apparatus as claimed in claim 5, wherein said sensor means are located proximate the infeed of said laminated web to said perforating device.

8. An apparatus as claimed in claim 5, wherein said movable carriage includes sensors for scanning the extent of displacement of said carriage upon the rearward movement of said carriage towards said slitting arrangement, said sensors being operatively connected with sensor means at said perforating device for calibrating the accuracy of the forward displacement of said laminated web.

9. An apparatus as claimed in claim 1, wherein vacuum suctioning devices engage said severed segments proximate the outlet end of said apparatus downstream of said movable carriage for placement on pluralities of base members for forming arrays of blister packages.

10. An apparatus as claimed in claim 1, wherein said movable carriage advances said laminated web a distance of 150 mm during each indexed forward motion of the carriage.

11. An apparatus as claimed in claim 1, wherein photoelectric sensor means verify the position of indicia on said laminated web prior to actuation of said cutting structure to ensure proper web indicia grouping.

12. An apparatus as claimed in claim 11, wherein said moveable carriage advances said laminated web a distance of 150 mm during each indexed forward motion of the carriage, said carriage advance is maintained at a degree of accuracy within ±0.50 mm.

13. An apparatus as claimed in claim 1, wherein a tension device imparts a predetermined variable tensile force to said laminated web during conveyance through said apparatus.

14. An apparatus as claimed in claim 13, wherein said tension device comprises a weighted roller device or a constant tensioner unit.

15. An apparatus for producing printed labels forming covers interconnecting a plurality of blister packages, said covers each being a segment severed from a continuous length of a laminated web, said apparatus including a framework for supporting said laminated web along a predetermined path of movement, comprising:

a) a movable carriage including grippers for engaging said laminated web and for intermittently advancing said web along said path of movement;

b) a printing arrangement for imprinting indicia on said laminated web at a first station along said path of movement;

c) a perforating device for imparting a plurality of spaced lines of perforations to said laminated web at a second station, said lines of perforations extending transversely across the width of said laminated web;

d) a cutting structure being mounted on said movable carriage for severing said continuous web portions into said segments to produce said printed label-forming covers; and e) wherein a slitting arrangement, comprising:

i) a disc-shaped slitting blade, ii) a stationary support for said slitting blade, and iii) a gripping means for clamping said laminated web during intervals when the grippers on said movable carriage are disengaged from said laminated web, imparts a continuous slit to said laminated web and is located at a third station downstream of said perforating device in the direction of conveyance of the laminated web for slitting said web into at least two longitudinally extending continuous web portions.

16. An apparatus for producing printed labels forming covers interconnecting a plurality of blister packages, said covers each being a segment severed from a continuous length of a laminated web, said apparatus including a framework for supporting said laminated web along a predetermined path of movement, comprising:

a) a movable carriage comprising a pair of spaced uprights and grippers for engaging said laminated web and for intermittently advancing said web along said path of movement;

b) a printing arrangement for imprinting indicia on said laminated web at a first station along said path of movement;

c) a perforating device for imparting a plurality of spaced lines of perforations to said laminated web at a second station, said lines of perforations extending transversely across the width of said laminated web;

d) a cutting structure being mounted on said movable carriage for severing said continuous web portions into said segments to produce said printed label-forming covers and located between said uprights; and e) actuating means being operatively connected to said cutting structure for placing said cutting structure into a web-severing condition upon the carriage reaching the forward advanced, position thereof in said apparatus.

17. An apparatus as claimed in claim 16, wherein said cutting structure comprises a cutter blade for severing said web into segments of predetermined lengths.

18. An apparatus as claimed in claim 17, wherein said actuating means comprises a pneumatically-operated piston and cylinder arrangement.

19. An apparatus for producing printed labels forming covers interconnecting a plurality of blister packages, said covers each being a segment severed from a continuous length of a laminated wetb said apparatus including a framework for supporting said laminated web along a predetermined path of movement, comprising:

a) a movable carriage including grippers for engaging said laminated web and for intermittently advancing said web along said path of movement;

b) a printing arrangement for imprinting indicia on said laminated web at a first station along said path of movement;

c) a perforating device for imparting a plurality of spaced lines of perforations to said laminated web at a second station, said lines of perforations extending transversely across the width of said laminated web; and d) a cutting structure being mounted on said movable carriage for severing said continuous web portions into said segments to produce said printed label-forming covers; wherein photoelectric sensor means verify the position of indicia on said laminated web prior to actuation of said cutting structure to ensure proper web indicia grouping; and wherein said moveable carriage advances said laminated web a distance of 150 mm during each indexed forward motion of the carriage, said advance of 150 mm forms segments upon cutting said web each having a length of 150 mm and four spaced transverse perforation lines to produce printed label covers each conveying a linear array of blister packages of respectively each 30 mm in width.

* * * * *

UNITED STATES PATENT AND TRADEMARK OFFICE

CERTIFICATE OF CORRECTION

PATENT NO. : 5,565,059

DATED : October 15, 1996

INVENTOR(S) : Edwards, et al.

It is certified that error appears in the above-indentified patent and that said Letters Patent is hereby corrected as shown below:

Column 11 - Line 28 - change "wet)" to "web"

Column 14 - Line 7 - change "wetb" to "web,"

Signed and Sealed this

Eleventh Day of November, 1997

Attest:

BRUCE LEHMAN

*Attesting Officer*

*Commissioner of Patents and Trademarks*